United States Patent [19]

Miller

[11] Patent Number: 4,815,812
[45] Date of Patent: Mar. 28, 1989

[54] ALIGNABLE SINGLE CHANNEL FIBER OPTIC ROTARY JOINT

[75] Inventor: Michael B. Miller, Blacksburg, Va.

[73] Assignee: Litton Systems, Inc., Blacksburg, Va.

[21] Appl. No.: 436,508

[22] Filed: Oct. 25, 1982

[51] Int. Cl.$^4$ ............................................. G02B 6/38
[52] U.S. Cl. ............................. 350/96.21; 350/96.20
[58] Field of Search ................. 350/96.20, 96.21, 96.22

[56] References Cited

U.S. PATENT DOCUMENTS

| | | | |
|---|---|---|---|
| 4,132,461 | 1/1989 | Jacques et al. | 350/96.21 |
| 4,147,404 | 4/1979 | Hensel | 350/96.21 |
| 4,258,977 | 3/1981 | Lukas et al. | 350/96.21 |
| 4,265,511 | 5/1981 | Nicia et al. | 350/96.21 |
| 4,373,779 | 2/1983 | Dorsey | 350/96.21 |

Primary Examiner—William L. Sikes
Assistant Examiner—Robert E. Wise
Attorney, Agent, or Firm—Brian L. Ribando

[57] ABSTRACT

An alignable single channel fiber optic rotary joint for effecting and maintaining accurate axial alignment of the input and output optic fibers maximizing optical throughput comprising, inner and outer housings rotatively joined at a bearing, ferrules loosely enclosed by the inner and outer housings, the ferrules comprising means for supporting an optic fiber and a lens, and for making an optical joint therebetween, alignment collar means for affecting radial displacement of the ferrules including, adjustment screw means for engaging and selectively positioning the alignment collar means thereby maximizing optical throughput between the input and output optic fibers, cement means for rigidly maintaining the alignment collar in the selected location, and end cap means for securing the cement means and providing fiber cable strain relief.

3 Claims, 1 Drawing Sheet

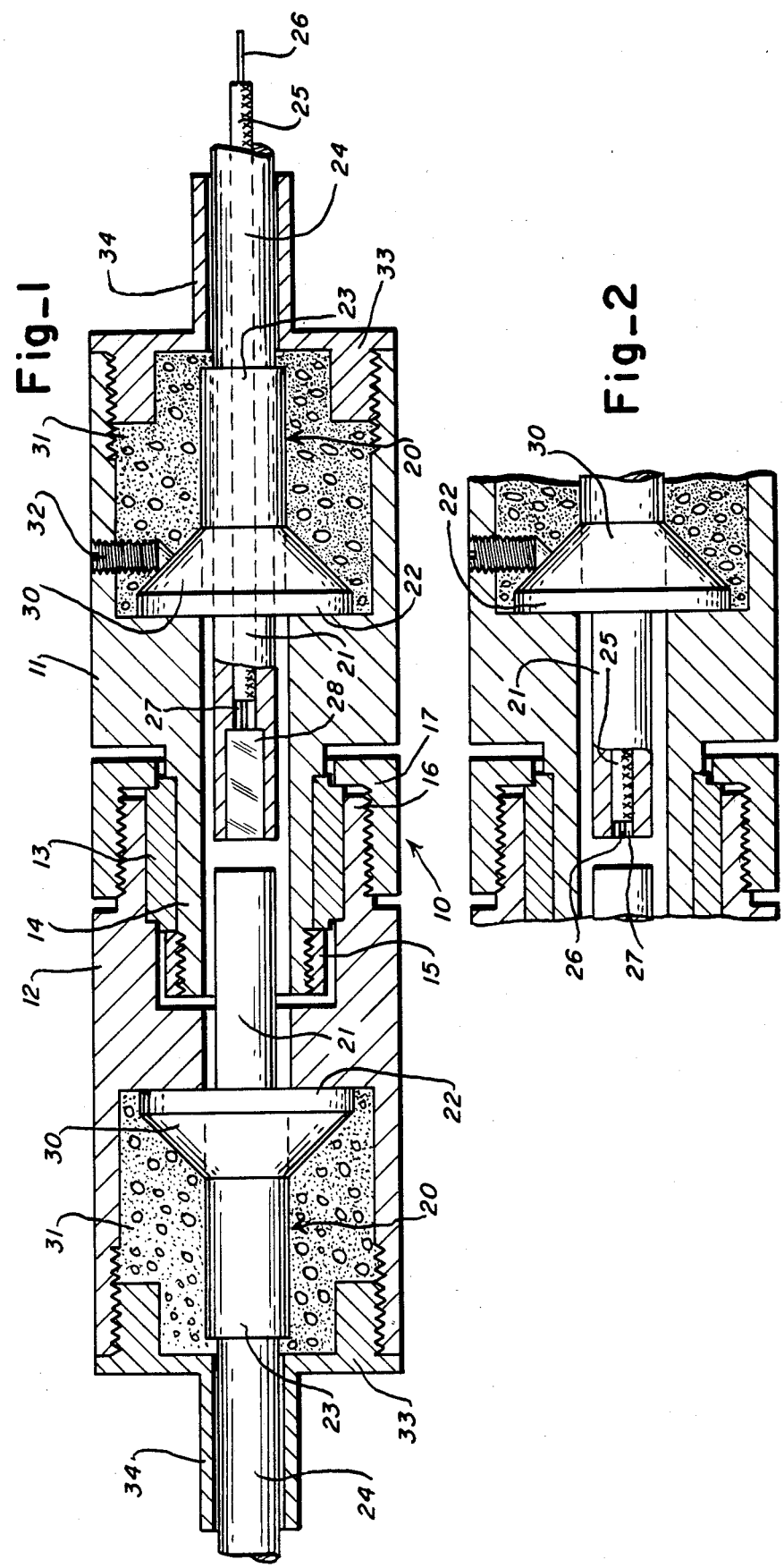

ALIGNABLE SINGLE CHANNEL FIBER OPTIC ROTARY JOINT

BACKGROUND AND OBJECTS OF THE INVENTION

The present invention relates to an alignable single channel fiber optic rotary joint. The fiber optic rotary joint is a modification and improvement over the subject matter of patent application Ser. No. 204,763, filed Nov. 7, 1980 now U.S. Pat. No. 4,373,779.

Insertion losses in an optical coupling are a function of optical element separation and axial alignment. In a rotary joint, the axial alignment becomes critical in order to minimize throughput variation as the joint rotates. It would be highly advantageous to provide a joint which, in the assembly process, has an infinitely variable axial alignment means for the optical ends of the fiber optic cables, both input and output.

An object of this invention is to provide an alignable single channel fiber optic rotary joint.

Other objects and advantages of the present invention will become apparent to those skilled in the art from the following description and accompanying drawing which illustrates a preferred embodiment incorporating the principles of the invention.

BRIEF DESCRIPTION OF THE DRAWING

FIG. 1 is a sectional view of the alignable single channel fiber optic rotary joint according to the invention.

FIG. 2 is a sectional view of the lens holder in an alternate embodiment.

DESCRIPTION OF THE INVENTION

An alignable single channel fiber optic rotary joint 10 is comprised of an inner housing 11 and an outer housing 12. The inner and outer housings are rotatively mounted, each to the other, at bearing 13. The bearing 13 is retained axially on the collar 14 of the inner housing 11 by retaining nut 15. The bearing 13 is retained axially in the collar 16 of the outer housing 12 as retaining nut 17 threadedly engages the collar 16 joining the housing 11 and 12. Thus assembled, the housings are free to rotate relative to each other about the bearing 13.

The flanged ferrules 20 are each comprised of a lens holder 21 with a flange 22 to which is attached a cable support sleeve 23. The single fiber cable 24 is inserted into support sleeve 23 engaging the sleeve under light compression. The optic fiber sheath 25 and the optic fiber 26 extend beyond the flange 22 and are retained in the tubular chamber 27. Housed in the greater diameter of tubular chamber 27 is the lens 28 which abuts the end of the optic fiber 26.

The alignment collars 30 are assembled over the fiber cables 24 and the cable support sleeves 23. The adjusting screws 32 are threaded to the inner and outer housings 11 and 12 about their circumferences and spaced 120° apart. The assembled ferrules 20 together with the alignment collars 30 are inserted into the cavities 31 of the housings 11 and 12 and are retained by adjusting screws 32 which engage the oblique surface of the alignment collars 30.

Using one of the optic fibers 26 as an input and the other as an output, the optical throughput is maximized as the adjusting screws 32 cause the flanged ferrules 20 to move radially effecting axial alignment of the lenses 28. The optimum axial alignment is maintained by filling the cavities 31 with an epoxy or other suitable cement and threading the end caps 33 into housings 11 and 12. The end caps 33 are constructed with a tubular collar 34 to provide strain relief for the fiber cable 24.

In FIG. 2 as an alternative to the preferred embodiment described, the lens holders 21 can be configured to extend the tubular chamber 27 sized to retain the optic fiber sheath 25 through the entire length of the lens holder. With such construction, the lenses are eliminated and the optical coupling is between the fibers 26 rather than the lenses.

What is claimed is:

1. An alignable single channel fiber optic rotary joint for effecting and maintaining accurate axial alignment of the input and output optic fibers to maximize optical throughput comprising:

inner and outer housings rotatively joined at a bearing, ferrules loosely enclosed by said inner and outer housings, said ferrules comprising means for supporting an optic fiber, alignment collar means for affecting radial displacement of said ferrules including adjustment screw means for engaging and selectively positioning said alignment collar means thereby maximizing optical throughput between said input and output optic fibers, cement means for rigidly maintaining said alignment collar in said selected location, and end cap means for securing said cement means and providing fiber cable strain relief.

2. An alignable single channel fiber optic rotary joint for effecting and maintaining accurate axial alignment of the input and output optic fibers of input and output fiber optic cables for maximizing optical throughput comprising:

inner and outer housings rotatively joined at a bearing, end cap means on each of said housings for providing a strain relief and supporting said optic fiber cables, ferrules mounted on said optic fibers and loosely enclosed by said inner and outer housings, said ferrules comprising means for supporting an optic fiber and a lens, and for making an optical joint between said input and output optic fibers, alignment collar means for affecting radial displacement of said ferrules, said alignment collar means including adjustment screw means for engaging and selectively positioning said alignment collar means thereby maximizing optical throughput between said input and output optic fibers, said adjustment screw means and said alignment collar means being located between said end cap means and said lens, whereby the alignment of said optic fibers in the rotary joint may be adjusted by radially displacing said optic cables, and cement means for rigidly maintaining said alignment collar in said selected location.

3. The alignable single channel rotary optic joint of claim 2 further comprising:

a frustoconical cone comprising said alignment collar, and a conical surface on the end of each alignment screw, the conical surface end of each alignment screw engaging the frustoconical cone of the alignment collar.

* * * * *